United States Patent [19]
Kozlowski

[11] 3,765,854
[45] Oct. 16, 1973

[54] METHOD AND APPARATUS FOR MAINTAINING CONSTANT MOISTURE LEVEL IN A WETTED GLASS BATCH

[75] Inventor: Joseph J. Kozlowski, Muncie, Ind.

[73] Assignee: Ball Corporation, Muncie, Ind.

[22] Filed: Dec. 18, 1970

[21] Appl. No.: 99,435

[52] U.S. Cl............................ 65/27, 65/161, 65/335, 106/52, 214/18.2, 214/18.26
[51] Int. Cl.............................................. C03b 3/00
[58] Field of Search.................... 65/160, 161, 27, 65/335, 134, 135, 136; 214/18 GD, 18.2, 18.26; 106/52, DIG. 8

[56] References Cited
UNITED STATES PATENTS 3,200,971   8/1965   Trethewey.................... 214/18.2
3,294,555   12/1966  Krinov......................... 65/27 UX Primary Examiner—Arthur B. Kellogg
Attorney—Gilbert E. Alberding

[57] ABSTRACT

An apparatus and method is disclosed for automatically wetting glass batch to provide a constant moisture level in the batch. As glass batch is moved along a trough by rotating a screw assembly within the trough, a fluid, normally water, is added to and mixed with the batch. The moisture content of the glass batch is maintained constant by determining the level of batch in the furnace and, thus, sensing the amount of batch to be added and responsive thereto, the amount of water added is controlled by means of a water valve governing the flow rate of water into the trough.

17 Claims, 2 Drawing Figures

PATENTED OCT 16 1973
3,765,854
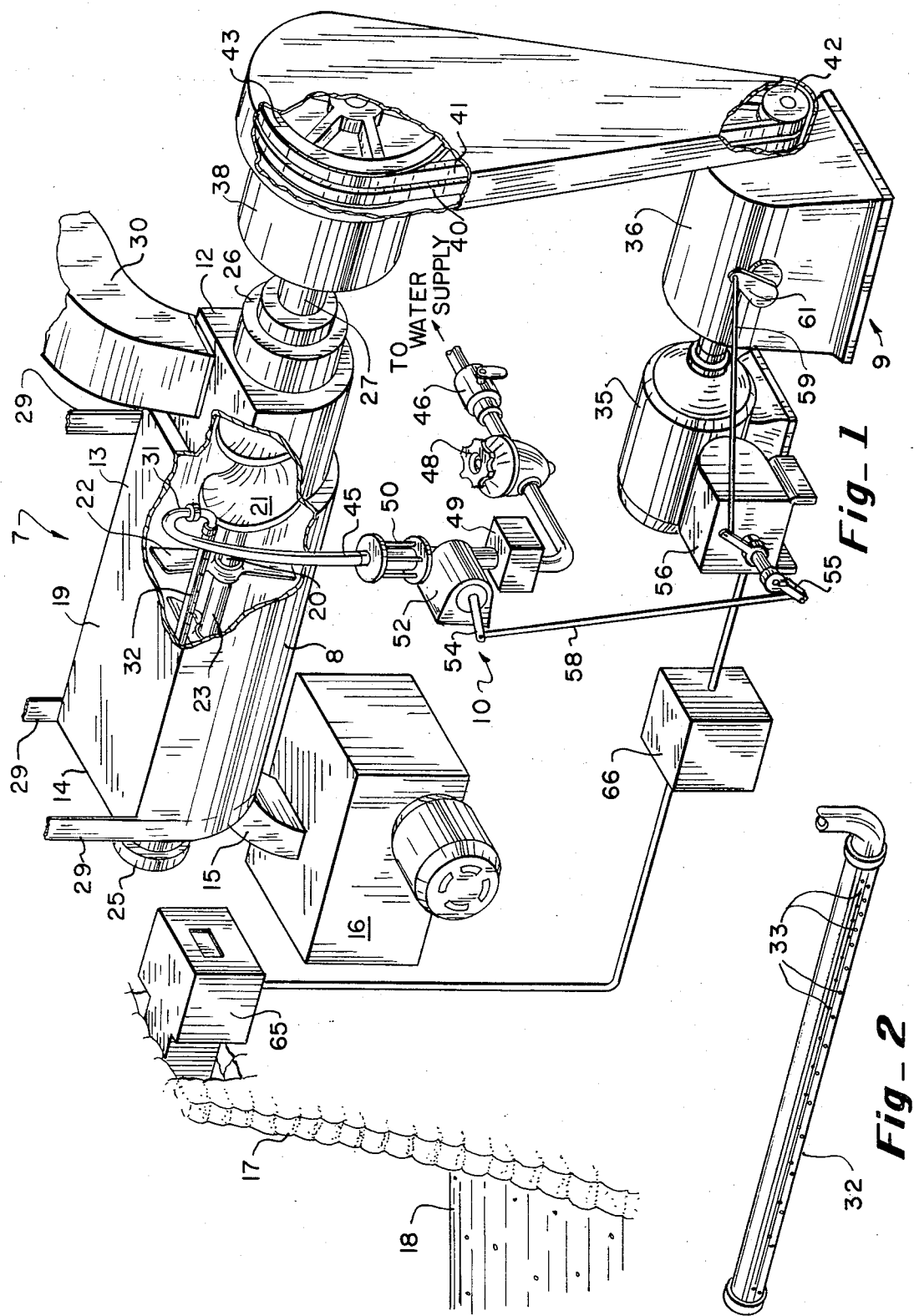
Fig_1
Fig_2

METHOD AND APPARATUS FOR MAINTAINING CONSTANT MOISTURE LEVEL IN A WETTED GLASS BATCH

BACKGROUND OF THE INVENTION

1. Field of the Invention

This invention relates to an apparatus and method for adding moisture to a glass batch and, more particularly, relates to automatically maintaining a constant moisture level in a glass batch.

2. Description of the Prior Art

As is well known, glass articles are commonly formed from glass in molten state. To supply such glass, it is also well known to utilize a glass furnace wherein glass batch is melted and then pulled from the furnace and supplied to glass forming machines. As the level of the glass in the furnace is lowered, additional glass batch must be added to the furnace and melted in order for the furnace to continue to meet the demands of the forming machines, it being normal to operate such machines on a continuous basis.

Glass batch normally contains an admixture of several components that are in a solid state, being normally finally divided and pulverant particles; and, as a result of mixing and/or delivery to the furnace, adverse dust conditions have often occurred. Since such conditions can be detrimental, both from a standpoint of creating a possible health hazard and enhancing equipment malfunctions, various attempts have heretofore been made to reduce or eliminate this dust problem.

One of the more practical of these attempts has been to wet the batch to reduce dust. While wetting of the batch has reduced the problem, at least in some instances, a new problem has arisen due to variations in the moisture content of the batch, which variations are due, at least in part, to the fact that glass batch is added to the furnace in different amounts at different times. Heretofore, however, no known system has been developed and/or utilized that is capable of maintaining a constant moisture content in a glass batch.

SUMMARY OF THE INVENTION

This invention relates to an apparatus and method for automatically controlling and maintaining substantially constant the moisture content of a glass batch by controlling the amount of water delivered to the batch, depending upon the amount of batch to be wetted.

It is, therefore, an object of this invention to provide an improved apparatus and method for wetting of a glass batch.

It is another object of this invention to provide an apparatus and method for maintaining a constant moisture level in a glass batch.

It is yet another object of this invention to provide an apparatus for wetting a glass batch wherein the amount of batch provided can vary without causing undesirable changes in the moisture content of the glass batch.

It is still another object of this invention to provide an apparatus for wetting a glass batch wherein the wetting mechanism is responsive to changes in amount of batch moving through the apparatus so that the moisture level of a glass batch remains constant.

It is yet another object of this invention to provide a method of automatically controlling wetting of a glass batch to vary the fluid added to the glass batch responsive to the amount of batch added whereby the moisture level of the glass batch remains substantially constant.

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiment of the hereindisclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a partially cut-away perspective view of the batch wetting system of this invention; and FIG. 2 is a perspective view of the water distributor pipe shown in FIG. 1.

DETAILED DESCRIPTION OF THE INVENTION

Referring now to the drawings in which like numerals have been used for like components, batch wetting system 7 includes, generally, a batch wetting receptacle 8, driving system 9 and water control system 10. Batch wetting receptacle 8 is an elongated trough having a receiving end portion 12, a body portion 13 and a discharge end portion 14. Glass batch is delivered at the receiving end portion 12, and an outlet 15 is provided at the discharge end portion through which the wetted glass batch is discharged, preferably to a conventional glass furnace charger 16 which moves the batch into glass furnace 17 having molten glass 18 therein. Trough 8 is to be dimensioned and of a material to meet the specific needs of the particular installation and may be, for example, a trough made of abrasive resistant steel. As shown, a top cover 19 has been provided to further aid in preventing dust, but such a cover could be eliminated if found desirable or necessary.

A screw assembly 20, which includes a combination of an auger section 21 and a paddle section 22 fixed to shaft 23, is positioned within trough 8, said shaft being mounted for rotation at the ends of the trough in a nose bearing 25 and a rear bearing 26, with the end 27 of the shaft extending beyond rear bearing 26. Auger 21 and paddles 22 must, of course, be of a size to be received within the trough and must be long enough to accomplish the purpose of mixing of batch and moving the same to the discharge portion of the trough, the auger and paddles preferably extending from one end of the trough to the other.

Trough 8 is attached to frame 29 which may be anchored in any conventional manner as, for example, being attached to an overhead trolley or the like (not shown) so that the apparatus may be readily moved for maintenance purposes, and a hopper or chute 30 is positioned above trough 8 so that glass batch in the hopper is delivered to the receiving portion of the trough.

Fluid, normally water, is delivered to trough 8 through a fluid inlet 31 to which is attached a distribution pipe 32 having aperture 33 therein. Pipe 32 extends lengthwise above and, preferably, off-centered with respect to the paddles 22 in trough 8 to wet the glass batch being moved through the trough to the paddle section from the auger section due to rotation of shaft 23.

Shaft 23 is rotated by driving system 9 which includes motor 35, which can be an electric motor, and which motor powers a dependent variable speed control driving means 36, which can be positively infinitely variable (PIV) drive, such as, for example, an "HG-4" PIV drive manufactured by Link Belt Manufacturing Company. Driving means 36 is operationally connected with conventional shaft-mounted reducer 38, such as, for example, a No. 315D2 shaft-mounted reducer manufactured by Link Belt Manufacturing Company, by belts 40 and 41 on pulleys 42 and 43, the former of which is rotated by PIV drive 36 and the latter of which drives the reducer 38. Thus, motor 35 drives PIV drive 36 which, in turn, drives shaft-mounted reducer 38 to rotate shaft 23 to which reducer 38 is connected for rotation of the same.

As shown in FIG. 2, water distribution pipe 32 is connected to hose 45 which, in turn, is connected to a water supply (not shown) where water is the fluid utilized. Hose 45 has a water cock shut-off 46 which is open for normal operation. With water delivered to hose 45, it passes through a conventional pressure regulator 48, a conventional electric solenoid valve 49 and a conventional flow meter 50, all of which are provided for flow control. Valve 49 is connected with a mechanical paddle (not shown) on the hopper 30 to cut off water flow if no batch is present in the hopper, while regulator 48 insures a constant water supply pressure to the water valve.

The water is metered into trough 8 by a water valve 52 which can vary the amount of water being delivered depending on batch flow. Water valve 52 has an arm 54 controlling the flow of water therethrough, which arm is attached to a crank arm 55 which, in turn, is connected to conventional valve drive 56 which can be, for example, a Series 60 electric control valve drive manufactured by Leeds and Northrupt Manufacturing Company, by rod 58.

Crank arm 55 is also attached by rod 59 to arm 61 of dependent variable speed control driving means 36, arm 61 controlling the through-put of the batch wetter, since it controls the speed of screw assembly 20. Thus, movement of crank arm 55 on valve drive 56, by being linked as described above, controls the position of the valve arm 54 (to thus control the flow of water) and the speed control arm 61 (to thus control the addition of batch). The batch wetting apparatus is controlled by the level of the glass 18 in furnace 17 by means of a conventional glass level indicator 65 (which senses the level of the glass and provides an electrical output indicative thereof in conventional fashion -glass level sensors and/or control systems being shown, for example, in U.S. Pat. Nos. 3,525,090, 2,483,333, 2,585,607, 2,625,593, 3,053,012, 3,126,741 and 3,233,756), the output indications from which control the valve drive 56 through a conventional controller 66, such as, for example, a Series 60-PAT control unit manufactured by Leeds and Northrupt Manufacturing Company.

Thus, as the glass level falls in the furnace, more batch is delivered through the batch wetting trough to the furnace (as brought out more fully hereinabove, the glass level indicator indicates the low glass level and hence the need for more batch to be added to the furnace), since valve drive 56 causes an increase in the output of the PIV drive 36 by a change in position of crank arm 55 which causes the speed control lever 61 to be moved forward, thereby increasing the speed of the screw assembly 20. At the same time with the increased speed of the screw assembly 20, the valve drive 56, by movement of crank arm 55, moves valve arm 54 to deliver more water to the water distribution pipe 32 and through the outlets 33 for wetting the batch. If the level of glass is raised in the furnace, there is a simultaneous action to slow the speed of the screw assembly 20 and also to lessen the amount of water delivered through the water distribution pipe 32 for wetting the batch in the same manner as explained above for increased speed and flow of water.

Initially, the various components are chosen and set so that the amount of water delivered to the water distribution pipe will reflect the desired moisture content of the wetted glass batch. Thus, by determining the desired moisture level, the valve arm 54, crank arm 55, speed control arm 61, and rods 58 and 59 must be interconnected relative to each other so that a batch with the desired moisture content is achieved. Once set, then as the amount of batch delivered to the batch wetting apparatus increases and decreases, the moisture content will remain constant, due to the respective increase and decrease of the flow of water relative to the speed of the screw assembly 10 which controls the put-through of batch.

FIG. 2 shows the water distributor pipe 32 and illustrates that it has been found to be preferable that the holes 33 therein be more numerous at the end of said water distribution pipe 32 to the inlet hose 45 which is nearer the point where the auger assembly ends and the paddle assembly begins within the trough. It has been found that this arrangement of apertures in the distribution pipe reduces batch caking at the point where the batch is moved from the auger portion 12 to the paddle portion 13.

In operation, the desired moisture level is determined, which, by way of example, is thought to be best around 3 ½ percent. Water valve arm 54 and the dependent speed control arm 61 are then adjusted relative to each other by connection with rods 58 and 59 to crank arm 55 to provide for the desired moisture level at a given put-through of batch. Thereafter, the batch wetting apparatus is fully automatic. Batch is delivered to the trough and the auger assembly moves batch to the paddle portion of the trough where water is delivered through the water distribution pipe to wet the batch, the amount of water delivered being dependent on the rotational speed of the screw assembly. As brought out hereinabove, if a change occurs, to add batch at a higher rate (during which the screw assembly will be speeded up), additional water will be provided; and, likewise, if a change occurs, to add batch at a lower rate (during which the screw assembly will be slowed down), less water will be provided.

During operation, periodic moisture checks may be made to assure proper functioning of equipment. Such checks should, of course, also be made if changes are made in batch formulation and/or cullet content. Such checks may be made by collecting a wetted sample of batch prior to entrance into the glass furnace. The sample is weighed and then dried, after which the dry weight is subtracted from the wet weight to determine the amount of water in the sample. The percent of moisture content is calculated by dividing the weight of sample water by the weight of the wet batch sample. As brought out hereinabove, the ideal percent moisture content is thought to be about 3 ½ percent, but the best percent moisture content for any particular installation can best be determined by batch carry-over tests and fuel efficiency determinations.

It is readily apparent from the above discussion that the increase and decrease in the rotational speed of the screw assembly and the respective increase and decrease in the amount of water delivered for mixing with the batch provides a novel apparatus and method for automatically maintaining a constant moisture level in a glass batch.

What is claimed is:

1. Apparatus for automatically wetting a glass batch with a liquid in controlled amounts comprising: receptacle means having an inlet portion and an outlet portion spaced from one another; means for delivering batch to said inlet portion of said receptacle means; batch moving means for moving said batch through said receptacle means toward the outlet portion thereof; batch movement determining means connected with said batch moving means to control the rate of batch movement through said receptacle means toward said outlet portion; liquid delivering means for delivering liquid to said receptacle to mix with said batch therein being moved toward said outlet; and control means for sensing the amount of batch delivered from said receptacle, said control means being connected with said liquid delivering means so as to control the rate of flow of liquid therefrom to thereby initially establish a moisture level of batch delivered from the outlet of said receptacle and to vary the rate of flow of liquid through said liquid delivering means in response to sensed variations in the amount of batch delivered from said receptacle so as to thereby maintain a substantially constant moisture level of batch delivered from the outlet of said receptacle.

2. The apparatus of claim 1 wherein said fluid delivered to said receptacle is water.

3. The apparatus of claim 1 wherein said receptacle means includes a long trough and wherein said means for delivering liquid includes distribution means within said trough connected with said control means for delivering fluid at a controlled rate to said trough.

4. The apparatus of claim 1 wherein said control means is connected with said batch movement determining means and said liquid delivering means so as to control both put-through of batch and liquid delivery in said receptacle.

5. The apparatus of claim 4 wherein said control means includes sensing means for sensing the quantity after delivery of said batch from said receptacle and providing an indication thereof, and wherein said control means also includes drive means connected with said batch flow determining means and said liquid determining means and responsive to indications from said sensing means for automatically controlling said batch moving means and said liquid delivering means.

6. The apparatus of claim 4 wherein said batch moving means includes a screw assembly within said receptacle, the rotational speed of which is controlled by said batch flow determining means, wherein said liquid delivering means includes a fluid flow control valve, and wherein said control means includes means connected with said batch flow determining means and said fluid flow control valve to thereby automatically control the speed of said screw assembly and the flow of liquid to said receptacle.

7. The apparatus of claim 6 wherein said batch flow determining means includes a positively infinitely variable drive means having a speed control arm for varying the output thereof, and wherein said fluid flow control valve has a control arm for varying fluid flow, said arms being operationally interconnected.

8. Apparatus for automatically wetting a glass batch with water in controlled amounts, comprising: receptacle means having an inlet portion and an outlet portion spaced from one another, said inlet portion being adapted to receive glass batch and said outlet portion being adapted to discharge wetted batch; means within said receptacle means for moving glass batch from said inlet portion to said outlet portion; means for delivering water to said receptacle, said water being mixed with said batch while said batch is being moved from said inlet portion to said outlet portion; speed control means connected with said glass batch moving means for controlling the rate at which batch is moved through said receptacle; water control means connected with said water delivering means for controlling the flow rate of said water delivered to said receptacle; and means operationally interconnecting said speed control means and said water control means for controlling the flow rate of water delivered to said receptacle relative to the amount of batch being put through said receptacle whereby wetted batch discharged from said outlet portion of said receptacle means has a substantially constant moisture level.

9. The apparatus of claim 8 wherein said apparatus also includes control means connected with said last-named means and sensing the amount of wetted batch needed and responsive thereto, automatically controlling both said speed control means and said water control means.

10. Apparatus for automatically wetting a glass batch with water in controlled amounts, comprising: a batch wetting trough having an inlet portion for receiving glass batch and an outlet portion for discharging said batch after said batch is wetted; a screw assembly rotatably mounted within said trough and having auger means extending from said receiving portion and paddle means extending to said discharge portion whereby said batch is moved through said batch wetting trough; means for delivering water to said trough, said water being received within said trough and added to said batch for mixing therewith by said paddle means; and control means for controlling the amount of water delivered to said trough in relation to the rotational speed of said screw assembly whereby the moisture content of said batch put through said trough is maintained substantially constant.

11. Apparatus of claim 10 wherein said water delivering means includes a water distribution pipe positioned lengthwise in said batch wetting trough above said paddle portion and wherein said water distribution pipe contains a plurality of outlets along the length of said water distribution pipe for delivery of water to said trough in controlled amounts.

12. Apparatus of claim 11 wherein said plurality of outlets in said water distribution pipe are more numerous nearer the end of said water distribution pipe which is adjacent to said auger means of said screw assembly.

13. Apparatus for automatically controlling addition of water to a glass batch while maintaining a constant batch moisture content, said apparatus comprising: a batch wetting trough having an inlet end for receiving glass batch in dry form and an outlet end for discharging said batch after said batch has been wetted; a screw assembly rotatably mounted lengthwise within said trough and having an auger portion and a paddle portion with said auger portion being contiguous to said inlet end and said paddle portion being contiguous to said outlet end, said batch being moved through said batch wetting trough by the rotational movement of said screw assembly; a water distribution pipe adapted to be connected with a source of water and having a plurality of outlets, said pipe being mounted lengthwise in said batch wetting trough above said paddle portion of said screw assembly for delivery of controlled amounts of water to said batch moving through said batch wetting trough at said paddle portion; a dependent variable speed control drive means operationally connected with said screw assembly for rotating said screw assembly at variable speeds; a motor operationally connected with said screw assembly through said variable speed control drive means for rotating said screw assembly; a variable opening water valve for controlling the amount of water being delivered to said trough through said distribution pipe; and valve drive means connected with said dependent variable speed control drive means for controlling the rotational speed of said screw assembly, said valve drive also being connected with said variable opening water valve for controlling the water flow through said water valve to control the amount of water being delivered for mixture with said batch in said trough so that, as the speed of said screw assembly is increased to move increasing amounts of batch through said batch wetting trough, said variable opening water valve permits an increased flow of water to be delivered to said batch wetting trough for mixing with said batch, and so that, as the speed of said screw assembly is decreased to move decreasing amounts of batch through said batch wetting trough, said variable opening water valve permits a decreased flow of water to be delivered to said batch wetting trough for mixing with said batch to thereby automatically maintain a substantially constant moisture content in the wetted batch.

14. A method for controlled wetting of a glass batch, said method comprising: providing a receptacle to receive glass batch and delivering batch to said receptacle; moving glass batch through said receptacle at a variable controlled rate; sensing the rate batch is being moved through said receptacle and adding fluid to said receptacle at a rate dependent upon the sensed rate of batch movement, said fluid rate being preselected with respect to a preselected rate of batch movement and being increased in response to increases in the sensed rate of batch movement and decreased in response to decreases in said sensed rate of batch movement; mixing said fluid and glass batch; and discharging said wetted glass batch from the receptacle after mixing has been completed, said discharged wetted glass batch having a substantially constant moisture level regardless of the rate of discharge.

15. The method of claim 14 wherein said fluid is water and wherein said water is mixed with said batch to wet the same.

16. The method of claim 14 wherein the rate glass batch is moved through said receptacle is controlled by sensing the need for wetted batch and governing the rate thereby, said fluid flow being likewise governed so that the moisture content of said wetted glass batch discharged from the receptacle is maintained substantially constant and at a rate needed for utilization.

17. A method for automatically wetting glass batch while controlling batch moisture content in an apparatus which includes a batch wetting trough having an inlet and outlet, a screw assembly rotatably mounted within said trough and having an auger portion and a paddle portion for moving glass batch through said trough from said inlet to said outlet at a rate dependent upon the rotational speed of said assembly, a water distribution pipe mounted in said trough above said paddle portion, a variable speed control driving means for rotationally driving said screw assembly, and a variable opening water valve for controlling water delivered to said water distribution pipe, said method comprising the steps of: determining the desired moisture level of said glass batch; initially adjusting said variable speed control driving means and said variable opening water valve to obtain a water flow rate for a particular rate of movement of batch through said trough achieving said desired moisture content; delivering batch through said inlet to said auger portion of said batch wetting trough whereupon the rotational movement of said screw assembly moves said batch through said trough; delivering water to said batch through said water valve and water distribution pipe to said trough at said paddle portion of said screw assembly whereupon the rotational movement of said paddle causes the water to be mixed with said batch; discharging wetted batch from said outlet; and simultaneously controlling adjustment of said variable speed control driving means and said variable opening water valve to maintain the proportional relationship established during said initial adjustment whereby said batch is maintained at a relatively constant moisture level even though increases and decreases occur in the amount of batch discharged from the trough.

* * * * *